United States Patent [19]

Thompson et al.

[11] 4,407,466
[45] Oct. 4, 1983

[54] JET NOZZLE ROTARY WING AIRCRAFT

[75] Inventors: Darrow Thompson, Playa del Rey, Calif.; Daniel L. Thompson, Riyadh, Saudi Arabia

[73] Assignee: Overseas International Distributors Company B.V., Geneva, Switzerland

[21] Appl. No.: 167,813

[22] Filed: Jul. 14, 1980

[51] Int. Cl.³ ................... B64C 27/39; B64C 27/18
[52] U.S. Cl. .......................... 244/17.11; 416/140; 416/142; 416/20 A
[58] Field of Search ............... 244/7 R, 7 A, 17.11, 244/17.19, 17.25, 17.27; 416/140 A, 142, 143, 153, 20-22, 90, 91, 106, 107

[56] References Cited

U.S. PATENT DOCUMENTS

| | | | |
|---|---|---|---|
| 2,021,481 | 11/1933 | Dornier | 416/20 A |
| 2,742,098 | 4/1956 | Jovanovich | 416/140 A |
| 3,073,394 | 1/1963 | Laufer | 416/20 A |
| 3,356,315 | 12/1967 | Kolodziej | 416/142 |
| 3,830,588 | 8/1974 | Nagler | 416/20 A |
| 3,838,940 | 10/1974 | Hollrock | 416/142 |
| 4,109,885 | 8/1978 | Pender | 244/7 R |

FOREIGN PATENT DOCUMENTS 687481 8/1930 France ................... 416/20 A

Primary Examiner—Galen L. Barefoot
Attorney, Agent, or Firm—Arnstein, Gluck & Lehr

[57] ABSTRACT

A rotary wing aircraft is disclosed and includes a fuselage, a gas turbine engine operated air compressor within the fuselage, and a jet nozzle driven rotor assembly situated over the fuselage and having a rotor axis about which the assembly rotates. The rotor assembly includes a generally hollow rotor hub and a plurality of generally hollow jet nozzle driven rotor blades extending radially outwardly of the rotor hub. The rotor hub defines air conduit means to the rotor blades. A section of at least one rotor blade comprises a foldable flexible air conduit for folding the rotor blade in a radial plane relative to the rotor hub. Releasable stabilizing means, including a droop stop, is disposed between the rotor hub and an outboard portion of the rotor blade beyond the flexible air conduit section, whereby the stabilizing means may be released and the blade folded in its radial plane with the flexible air conduit section acting as a hinge.

6 Claims, 3 Drawing Figures

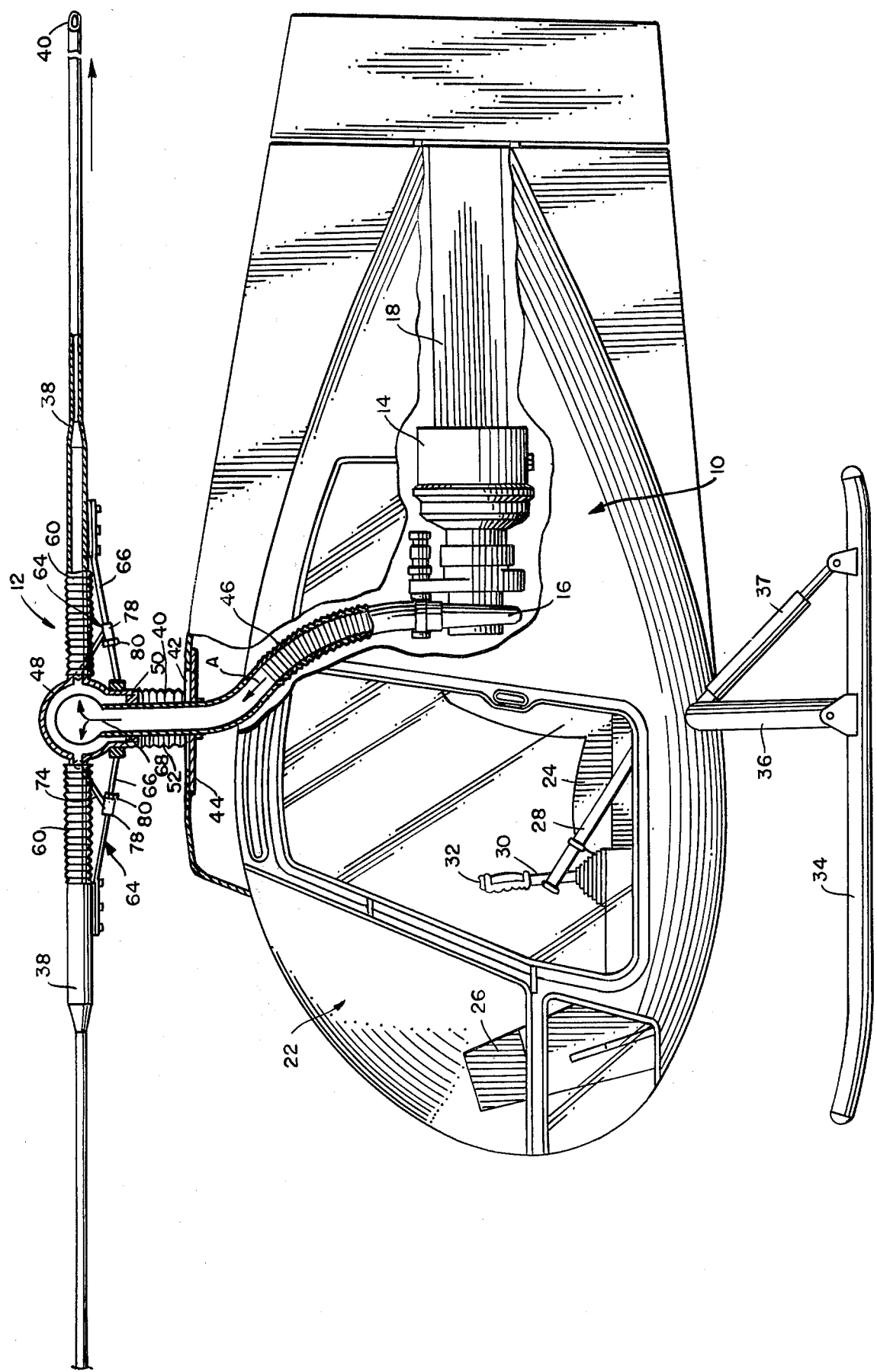

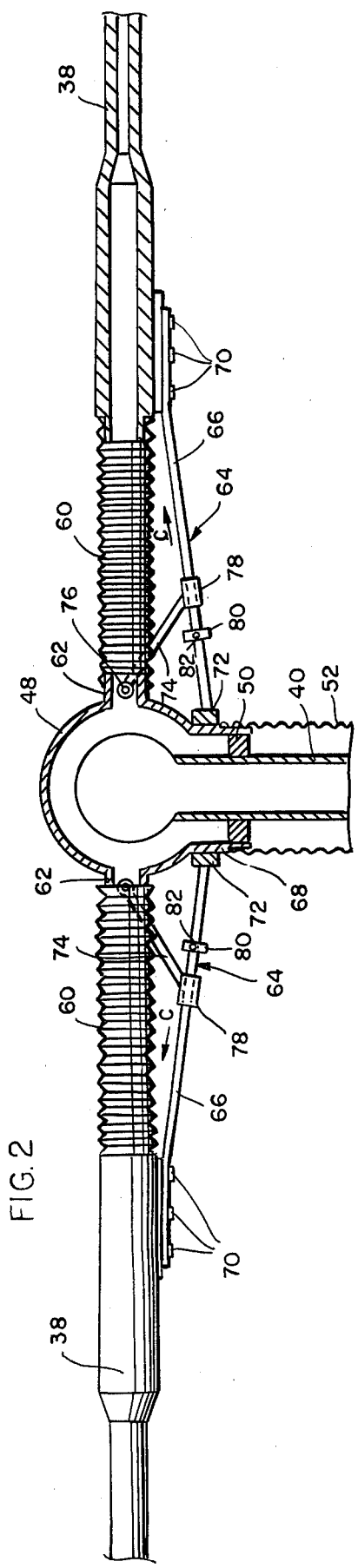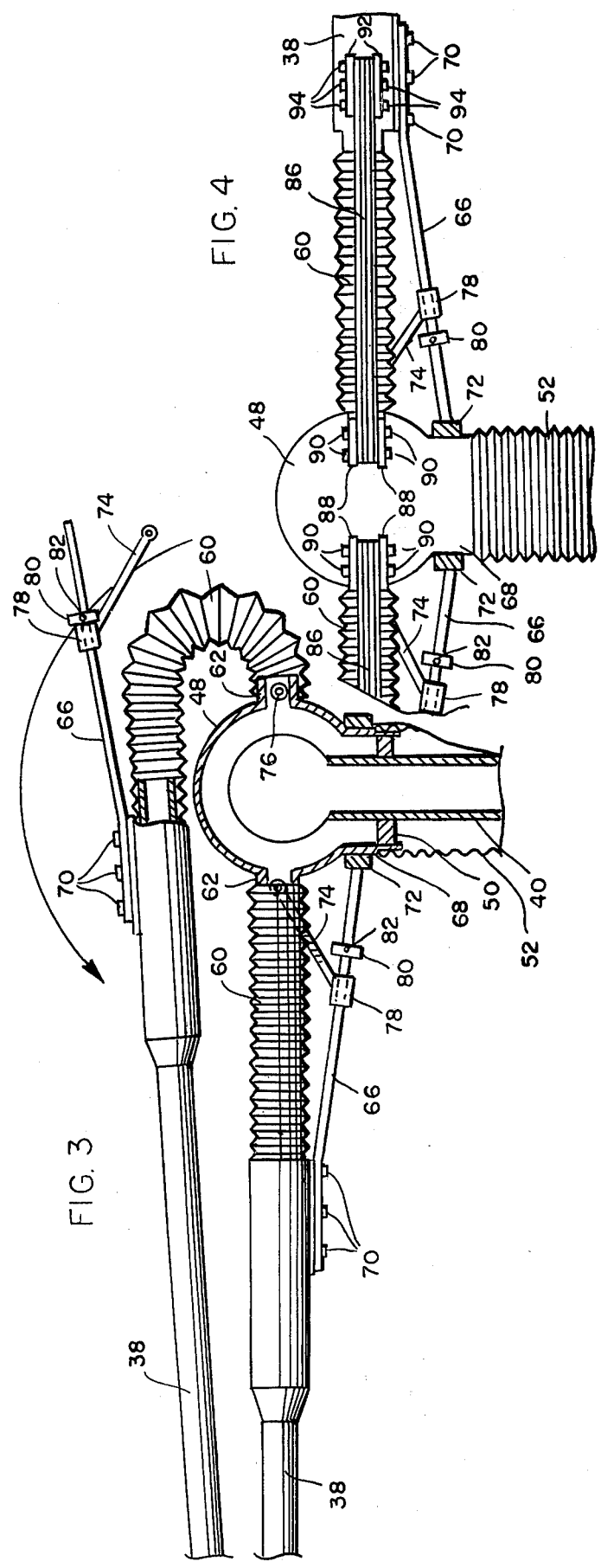

JET NOZZLE ROTARY WING AIRCRAFT

BACKGROUND AND SUMMARY OF THE INVENTION

The preesent invention relates to rotary wing aircraft, and in particular to a jet nozzle driven rotary wing aircraft which has means for folding at least one of the rotor blades about the rotor hub of the rotor assembly.

In rotary wing aircraft, such as helicopters, it often times is desirable to be able to fold one or more of the rotor blades to an inoperative or storing position so as to reduce the overall lateral dimensions of the craft. This is desirable for storing the craft in hangers, or during air or sea transport.

With conventional helicopters, the blades may be secured to the hub of the rotor by various forms of mechanical hinge means and the blades are interconnected by stay wires or the like for maintaining the relative position of the blades in their normal, radially outward, unfolded operative positions.

However, the development of high performance lightweight gas turbines has made it increasingly feasible to power the rotor assembly of a helicopter by ducting compressed air and/or the turbine gases directly to jet nozzles located at the rotor blade tips. This technique of rotor drive obviously eliminates the need for heavy torque transmitting members from the engine to the rotor blades and, additionally, the blades have a tendency to establish equilibrium by the action of the medium passing through the interior of the blades, along with centrifugal forces. With the rotor assembly being driven by the reactive force of a jet stream of air passing through the interior of the rotor blades, any folding means must not obstruct the free flow of the air through the blades, and the blades must be maintained substantially air impervious to the atmosphere without interferring with the movability of the folding means.

A principal object, therefore, of the present invention is to provide in a rotary wing aircraft, a new and improved means for folding the rotor blades relative to the rotor hub of the rotor assembly.

In the exemplary embodiment of the invention, a rotary wing aircraft is shown to include a fuselage, air compressor means within the fuselage, and a jet nozzle driven rotor assembly situated over the fuselage and having a rotor axis about which the assembly rotates. The rotor assembly includes a generally hollow rotor hub and a plurality of generally hollow jet nozzle driven rotor blades extending radially outwardly of the rotor hub. The hub defines an air conduit means to the rotor blades. Means is provided for folding at least one of the rotor blades in a radial plane relative to the rotor hub.

The folding means includes a section of the rotor blade comprising flexible air conduit means. Releasable stabilizing means is disposed between the rotor hub and an outboard portion of the rotor blade beyond the flexible air conduit section, whereby the stabilizing means may be released and the blade folded in its radial plane with the flexible air conduit section acting as a hinge. Preferably, the flexible air conduit section is of sufficient length to permit the rotor blade to be folded in a full 180° from its normal, radially outward, unfolded operative position.

In the embodiment of the invention shown herein, the stabilizing means includes a droop stop which prevents the rotor blade from tilting below a predetermined angle relative to the rotor hub. The droop stop is elongated and extends between the outboard portion of the rotor blade and a base portion of the rotor hub. In the exemplary embodiment of the invention, the droop stop is fixed at one end thereof to the outboard portion of the rotor blade, and is in free abutment at the other end thereof with the base portion of the rotor hub. A brace member is releasably connected at one end thereof to the rotor hub at a point spaced from said base portion thereof, and is slidably connected to the droop stop intermediate the ends thereof. Stop limit means is provided on the droop stop to limit the sliding movement of the brace member therealong.

Torsion means is provided to maintain the rotor blade in its radial plane notwithstanding the release of the stabilizing means for folding the blade.

Other objects, features and advantages of the invention will be apparent from the following detailed description taken in connection with the accompanying drawings.

DESCRIPTION OF THE DRAWINGS

FIG. 1 is a side elevational view of a jet nozzle driven rotary wing aircraft embodying the concepts of the present invention, partially broken away and in section to better illustrate certain operative components of the invention;

FIG. 2 is a fragmented and partially sectioned side elevational view, on an enlarged scale, of the rotor assembly of the present invention in its extended operative position;

FIG. 3 is a view similar to that of FIG. 2, with one of the rotor blades in its released, fully folded position; and FIG. 4 is a fragmented side elevational view of the rotor assembly illustrating the torsion means between the rotor hub and the rotor blades to maintain the blades in their respective radial planes.

DETAILED DESCRIPTION OF THE INVENTION

Referring to the drawings in greater detail, and first to FIG. 1, a rotary wing aircraft in the form of a helicopter is shown and includes a fuselage, generally designated 10, and a jet nozzle driven rotor assembly, generally designated 12. A lightweight gas turbine engine 14 is appropriately mounted within the fuselage 10 and is effective to operate an air compressor 16. An exhaust tunnel 18 extends rearwardly of engine 14 to direct exhaust gases rearwardly toward a vertical contact surfacce 20 which is provided for yaw control.

The aircraft also includes a plexiglass cockpit area, generally designated 22, within which is disposed conventional equipment such as an operator's seat 24, a control panel 26, a collective pitch stick 28, and a conventional cyclic pitch stick 30 which has a thumb switch 32 on the top thereof. Landing skids 34 are mounted on the underside of fuselage 10 by appropriate brackets 36, or the like, with a shock absorber 37 extending rearwardly and connected to each of the skids 34.

The rotor assembly 12 is of the jet nozzle driven type and includes a plurality of hollow rotor blades 38 with jet nozzles 40 at the distal ends thereof. The jet nozzles extend generally tangentially of the rotor blades at the blade tips and are effective to discharge the compressed air, resulting in rotor rotation.

Rotor support means is provided for supporting the rotor assembly 12 for rotation about a central vertical axis defined by a rigid air duct 40 which is mounted within an opening 42 at the top of the fuselage by a mounting bracket 44. Rigid air duct 40 extends into the fuselage and is in communication with the air compressor 16 by a flexible air conduit portion 46. The compressed air is directed upwardly from the air compressor through the flexible air conduit 46, in the direction of arrow A, and upwardly and outwardly through the rigid air duct 40, as indicated by the double headed arrow B, into the hollow rotor blades 38. A rotor hub 48 is mounted for rotation about a collar 50 secured to the rigid air duct 40, with a dust skirt 52 extending downwardly therefrom.

It should be noted at this time that appropriate means, not shown in the drawings in order to avoid cluttering the illustration, is provided between the rotor assembly, collar and fuselage to hold the rotor assembly and rotor hub and yet provide for rotation thereof. Of course, various such conventional means which does not form a part of the blade folding means of the present invention are known and are contemplated.

Referring to FIGS. 2 and 3, the present invention includes means for folding at least one of the rotor blades 38 in a radial plane relative to rotor hub 48. More particularly, the folding means includes an inboard section 60 of each rotor blade 38 which comprises a flexible air conduit. The flexible air conduit sections 60 are sealed at their outer ends to the hollow rotor blades, and at their inner ends to hollow, tubular bosses 62 extending radially outwardly of the hollow rotor hub 48.

Releasable stabilizing means, generally designated 64, are disposed between the rotor hub 48 and outboard portions of the rotor blades 38 beyond the flexible air conduit sections 60, whereby the stabilizing means may be released and the blades folded in their respective radial planes with the flexible air conduit sections 60 acting as hinge means. More particularly, the releasable stabilizing means 64 for each rotor blade includes a droop stop 66 which prevents the respective blade from tilting below a predetermined angle relative to the rotor hub 48. Each droop stop 66 is elongated and extends between the outboard portion of the rotor blade and a base portion 68 of the rotor hub. Each droop stop is fixed at its outer end, as by bolts 70 to the respective rotor blade. The inner end of each droop stop 66 is in free abutment with a slide member 72 which extends about the base portion 68 of the rotor hub.

An elongated brace member or arm 74 is releasably fixed at an inner end thereof to the rotor hub 48 and is slidably connected at the other end thereof to the droop stop 66, intermediate the ends of the latter. More particularly, the brace member 74 is releasably secured to the tubular boss 62 on the rotor hub 48, by a pin 76 or other appropriate releasable means. A sleeve 78 is secured to the other end of the brace arm 74. The sleeve surrounds the droop stop 66 and is slidable therealong.

Stop limit means is provided to prevent the rotor blades from coning, i.e., assuming an upward angle beyond a predetermined, desired limit in order to prevent the rotor blades from collapsing in flight. More particularly, a stop collar 80 is secured about each droop stop 66 by a set screw 82, or like positioning means, radially inwardly of the slidable sleeve 78. The stop collar can be positioned at any desired point along the droop stop 66, inwardly of the sliding sleeve 78 on the end of brace arm 74 and thereby prevent the droop stop from sliding outwardly of the sleeve, as indicated by the arrows C in FIG. 2. Of course, abutment of the inner end of droop stop 66 against the member 72 about the base portion 68 of the rotor hub 48 fixes the angle below which the rotor blade may not tilt relative to the rotor hub.

Referring to FIG. 3, this view shows the right-hand rotor blade 28 (as viewed in FIGS. 2 and 3) in its fully folded position relative to rotor hub 48 and overlying the left-hand rotor blade in their respective, common radial plane. The folding is accomplished by pulling pin 76 from the one end of brace arm 74 and simply folding the rotor blade, with the flexible air conduit section 60 acting as a hinge. To this end, the flexible air conduit section preferably is accordion-like and of sufficient length to permit the rotor blade to be folded a full 180°, as shown in FIG. 3, from its normal, radially outward, unfolded operative position shown in FIG. 2.

Torsion means also is provided to maintain the rotor blades in their radial planes notwithstanding the release of the stabilizing means for folding the blades. More particularly, referring to FIG. 4, a plurality of thin, flat and layered support straps 86 extend radially outwardly between rotor hub 48 and the outboard portions of the rotor blades 38, on opposite sides of the rotor blades. The strips are rigidly anchored at their inner ends to rotor hub 48 by brackets 88 and bolts 90. The straps are rigidly anchored at their outer ends to the outboard portions of the rotor blades 38 by brackets 92 and bolts 94. Thus, the thin flat straps can bend upwardly as the respective rotor blade is folded. However, the straps maintain the blades in their respective radial planes at all times, either when in their extended positions shown in FIG. 2 or the folded position of the one rotor blade shown in FIG. 3.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a rotary wing aircraft which includes a fuselage, air compressor means on said fuselage, a jet nozzle driven rotor assembly situated over said fuselage and having a rotor axis about which said assembly rotates, said rotor assembly including a generally hollow rotor hub and a plurality of generally hollow jet nozzle driven rotor blades extending radially outwardly of said rotor hub, said rotor hub defining air conduit means to said rotor blades, and means for folding at least one of said rotor blades in a radial plane relative to said rotor hub, said folding means including a section of said rotor blade comprising flexible air conduit means, releasable stabilizing means between said rotor hub and an outboard portion of said rotor blade beyond said flexible air conduit section, and releasable brace means between said rotor hub and said releasable stabilizing means, said releasable brace means being releasably connected to said releasable stabilizing means for sliding movement intermediate the ends of said releasable stabilizing means for preventing the rotor blades from coning beyond a predetermined limit whereby said releasable stabilizing means and said releasable brace means may be released from one another and said rotor blade may be folded in said radial plane with said flexible air conduit section acting as a hinge means.

2. In an aircraft as set forth in claim 1 including stop limit means on said releasable stabilizing means for limiting the sliding movement of said brace member in at least one direction along said releasable stabilizing means.

3. In an aircraft as set forth in claim 1, wherein said flexible air conduit section is of sufficient length to permit said rotor blade to be folded a full 180° from its normal, radially outward, unfolded operative position.

4. In an aircraft as set forth in claim 1, including torsion means to maintain said rotor blade in said radial plane notwithstanding the release of said stabilizing means for folding said blade.

5. In an aircraft as set forth in claim 1, wherein said releasable stabilizing means includes an elongated droop stop which extends between said outboard portion of said rotor blade and a base portion of said rotor hub, said droop stop preventing said blade from tilting below a predetermined angle relative to said rotor hub, said droop stop being fixed at one end thereof to said outboard portion of said rotor blade and being in free abutment at the other end thereof with said base portion of said rotor hub.

6. In a rotary wing aircraft which includes a fuselage, a rotor assembly situated over said fuselage and having a rotor axis about which said assembly rotates, said rotor assembly including a rotor hub and a plurality of rotor blades extending radially outwardly of said rotor hub and a pivotal connection between said rotor and said hub for pivotal movement of said rotor in a radial plane releasable stabilizing means between said rotor hub and an portion of said rotor blade outboard of said pivotal connection, releasable brace means between said rotor hub and said releasable stabilizing means, said releasable brace means being connected to said releasable stabilizing means for sliding movement intermediate the end of said releasable stabilizing means, and stop limit means on said releasable stabilizing means for limiting the sliding movement of said brace means in at least one direction along said releasable stabilizing means for preventing the rotor blades from coning beyond a predetermined limit.

* * * * *